United States Patent [19]

Harville

[11] 4,242,591
[45] Dec. 30, 1980

[54] ORBITALLY ROTATING PISTON ENGINE

[76] Inventor: Ronald W. Harville, 3103 D. Ave., National City, Calif. 92050

[21] Appl. No.: 961,887

[22] Filed: Nov. 17, 1978

[51] Int. Cl.³ .............................................. H02P 9/04
[52] U.S. Cl. .................................... 290/1 R; 310/11; 310/14; 60/641
[58] Field of Search .................... 310/11–14; 60/641; 290/1

[56] References Cited

U.S. PATENT DOCUMENTS

| | | | |
|---|---|---|---|
| 1,231,193 | 6/1917 | Powers | 310/14 X |
| 1,307,210 | 6/1919 | Newcomb | 310/14 X |
| 2,875,695 | 3/1959 | Justice | 310/12 X |
| 2,969,637 | 1/1961 | Rowekamp | 60/641 |
| 3,401,277 | 9/1968 | Larson | 310/11 |
| 3,453,462 | 7/1969 | Hsu et al. | 310/11 |
| 3,480,804 | 11/1969 | Tipton | 310/11 |
| 3,496,871 | 2/1970 | Stengel | 310/12 X |
| 3,927,329 | 12/1975 | Fawcett et al. | 290/1 |

*Primary Examiner*—Donovan F. Duggan
*Attorney, Agent, or Firm*—Clarence A. O'Brien; Harvey B. Jacobson

[57] ABSTRACT

The engine comprises a generally toroidal cylinder containing a piston having optional permanent magnets or electromagnets disposed thereon. The piston rotates through the cylinder due to a force exerted on it by expanding vapor. A shutter valve extends across the cylinder at one point and the vapor is injected between the shutter valve and the piston thereby forcing the piston to traverse the extent of the cylinder. An exhaust port is disposed such that the piston will pass it toward the completion of one revolution. The expanding vapor is exhausted through this port after which the piston momentum forces it past the shutter valve where a fresh supply of vapor is injected and the cycle repeats itself. Sensors and valving arrangements are supplied for providing optimum timing of the vapor injection. Also coils are disposed about the toroidal surface through which the magnet carrying piston passes for the production of electrical energy. Alternatively, the rotating piston may be connected to a rotor plate having a centrally located shaft which may be connected to a conventional alternator or mechanical uses. The system may be run by external combustion through the use of a boiler or it may be directly powered by solar energy.

14 Claims, 9 Drawing Figures

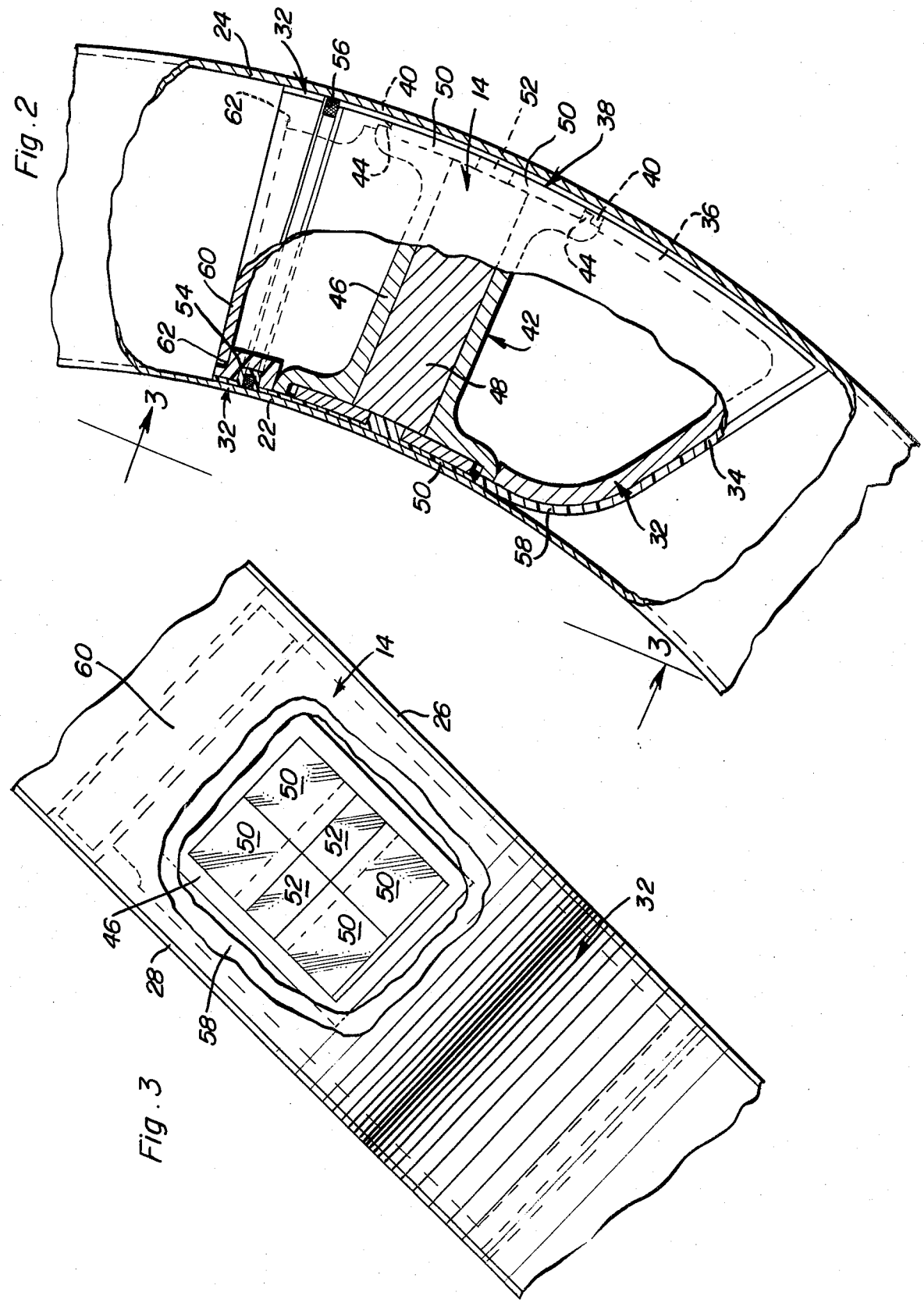

ORBITALLY ROTATING PISTON ENGINE

BACKGROUND OF THE INVENTION

1. Field of the Invention

This invention relates to devices for the conversion of heat energy into mechanical energy and electrical energy and especially engines which perform this transformation through the use of rotating pistons.

2. Description of the Prior Art

In the past, many and varied types of engines have been known for producing mechanical motion and transforming this motion into electrical energy. The standard internal combustion engine is probably the most notable among these. The internal combustion engine is plagued with numerous deficiencies, however. The internal combustion engine uses large amounts of fossil fuel thereby rapidly depleting this precious natural resource. Furthermore, due to the nature of the confinement of the combustion of the gases in this type of engine, numerous hazardous pollutants are emitted into the environment. Also, the internal combustion engine is not amenable to use with a solar energy source. As solar energy is now coming to be seen as a viable source of future energy for the world, an engine is required which may efficiently convert solar energy into mechanical or electrical power.

The well known turbine engine is an external combustion engine which may be capable of overcoming some of the deficiencies of an internal combustion engine. However, this type of engine is plagued with deficiencies of its own. For example, the high operating temperatures together with the high operating pressures inherent in a turbine make it incompatible for use in a domestic environment.

SUMMARY OF THE INVENTION

An object of my present invention is to provide an engine wherein mechanical energy may be efficiently transformed into electrical energy. In one embodiment of the invention, a free piston rotates through a circular path. The piston carries with it several magnets and at least one toroidal coil is disposed to cut the flux lines of the magnets thereby producing electrical energy without the need for intervening mechanical linkages.

A further object of the present invention is to provide the engine which is run by the use of a Rankine cycle. In this manner, the engine may use external combustion techniques thereby reducing pollution and making the engine amenable for use with many various types of fuels which are commonly available. Alternatively, power may be supplied to the system directly by the use of a solar panel.

A still further object of my present invention is to provide a Rankine cycle piston engine wherein the piston has an extremely long stroke thereby enabling the maximum expansion of the gas used in the Rankine cycle and thus providing an engine with a high efficiency.

One still further object of the present invention is to provide a basic design which can incorporate a rotating shaft for the operation of a standard alternator or mechanical devices if desired.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an elevational part sectional view showing the shape of the piston and location of the magnets of the free piston embodiment.

FIG. 3 is a plan view of the piston taken substantially along a plane passing through section line 3—3 of FIG. 2.

DESCRIPTION OF THE PREFERRED EMBODIMENT

Figure 1:
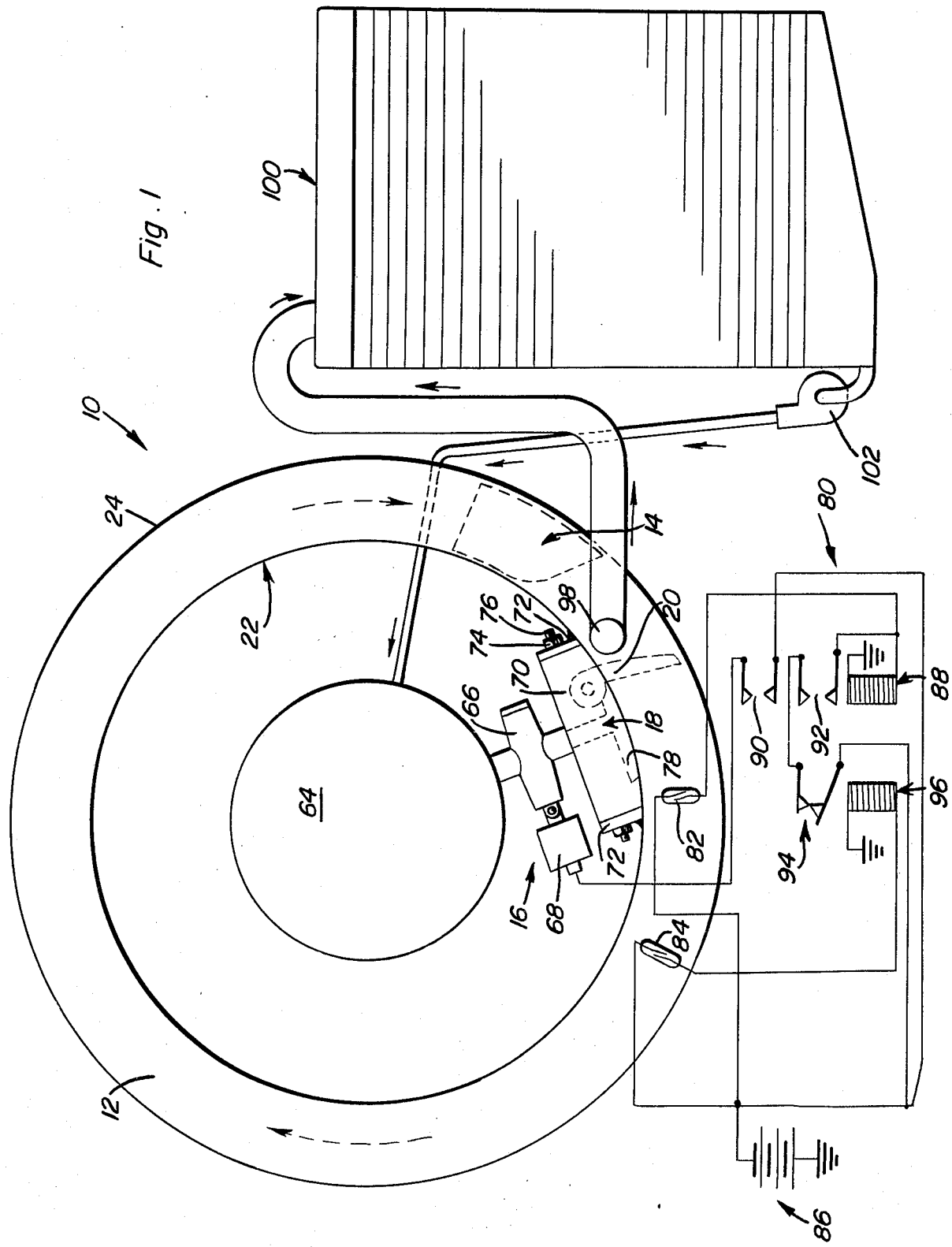
FIG. 1 is a schematic diagram illustrating the operation of the free piston embodiment of the invention.

Now with reference to the drawings, the rotating piston engine of the invention will be clearly set forth. With particular reference to FIGS. 1-3, the free piston embodiment of the invention, generally referred to by numeral 10, will be clearly described in detail. As can be seen in FIG. 1, the engine has a basically toroidal chamber 12 which is traversed by free piston 14. Power is supplied to the piston 14 through the valving mechanism 16 which allows entry of an expanding vapor through inlet port 18. The expanding vapor acts against piston 14 and shutter valve 20 and thereby imparts motion to the piston.

Figure 8:
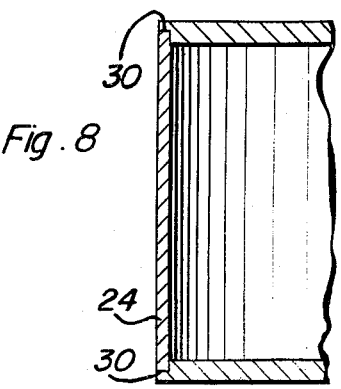
FIG. 8 shows one wall configuration for the piston chamber.
Figure 9:
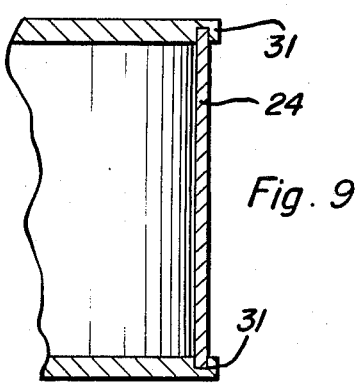
FIG. 9 shows an alternate wall configuration for the piston chamber.

The chamber 12 is not perfectly toroidal in shape. Due to considerations of manufacturing costs, cylinder 12 is given a square cross section and is constructed of an inner circular wall 22, an outer circular wall 24 and two radially extending side walls 26 and 28. The side walls are preferably constructed of 304 non-magnetic stainless steel or any other suitable non-ferrous metal. The side walls of the cylinder constitute the main structural support of the engine. The finished thickness of the walls should be approximately 0.375 of an inch. The inner and outer circular walls will also be made from 304 stainless sheet metal. These walls should preferable have a thickness from between 0.062 and 0.118 of an inch. The side walls may be connected to the circular walls as shown in FIG. 8 or FIG. 9. In FIG. 8, it will be seen that outer circular wall 24 is disposed within circumferentially extending notches 30. The connection may be maintained by the use of welding or any other suitable connection means. In FIG. 9, it will be seen that a similar connection is made except that in this case, the addition of flanges 31 on the side walls provides for a more secure engagement between the walls. Again, welding or any other suitable permanent engagement means may be employed for maintaining this connection. In some uses a toroidal chamber can be substituted.

Figure 4:
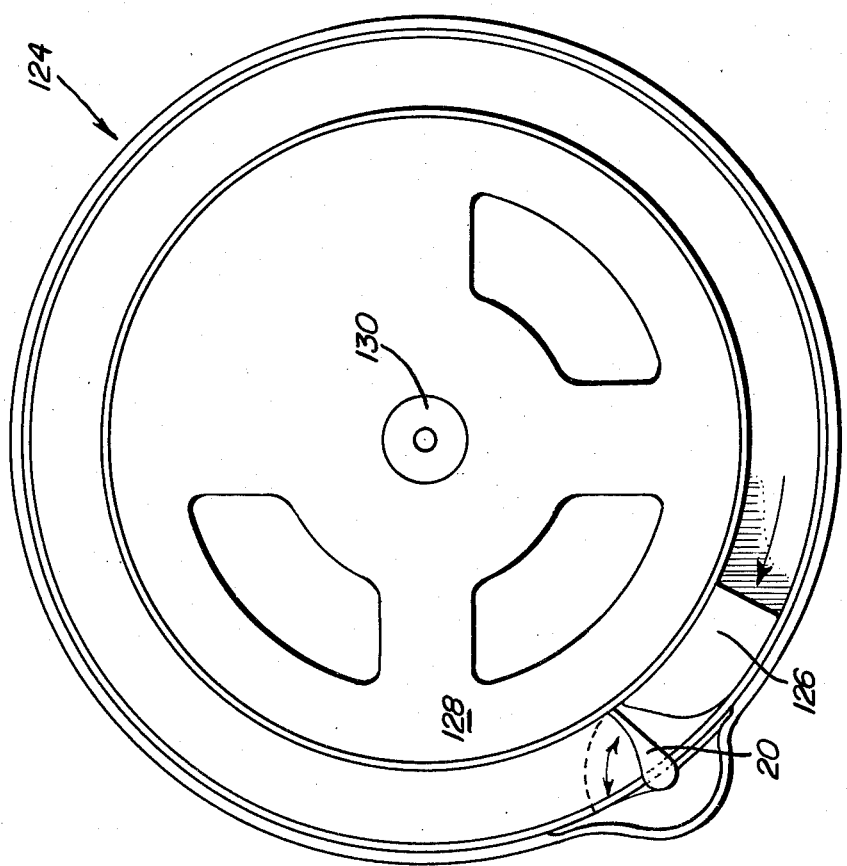
FIG. 4 is a schematic view demonstrating the operation of the rotating shaft embodiment of the invention.

FIGS. 3 and 4 show piston 14 in detail. The piston has a main body 32 which is preferably made from aluminum and may be cast or machined from bar stock. The main body 32 is preferably produced having a hollow conformation to reduce the weight of the piston. The body is shaped to conform with the four walls of the piston chamber and has a front sloped surface 34 which is configured for making contact with the shutter valve 20. The piston arcuate outer surface 36, which is in contact with circular wall 24 includes an open central portion 38 which contains a peripheral step 40 for accepting the outer surface of magnetic insert 42. Insert 42 has complementary step portions 44 which co-act with step 40 to hold the insert within the piston under centrifugal force created during the rotation of the piston. The magnetic insert has a body 46 with a soft iron piece 48 bonded internally thereof. On both longitudinal ends of the insert, there are bonded sumarium cobalt magnets 50 with smaller magnets 52 bonded therebetween. It is contemplated that a total of eight larger magnets 50 and the four smaller magnets 52 should be used on the piston. Other field magnet designs can also be used.

Toward the rear of the piston body 32, a circumferentially extending slot 54 is included and provides the support surfaces for pressure seal 56. Pressure seal 56 seats in slot 54 and presses against the inner and outer circular walls as well as the side walls of the chamber in order to prevent against the escape of expanding vapor past the piston. The seals are teflon seals having a 20% glassfiber reinforcement wrapped about stainless steel tensioning springs. Additional sealing and surfacing is afforded by the use of teflon coating 58 which covers the magnets as well as the main body of the piston on all four sides which contact the walls of the chamber as well as the forward sloped portion 34 of the piston. The rear of the piston is enclosed by rear coverplate 60 which is seated in a depression 62 in the rear of the piston body and held in place by welding or any other suitable bonding technique. At moderate piston speeds lubrication is not required.

Figure 7:
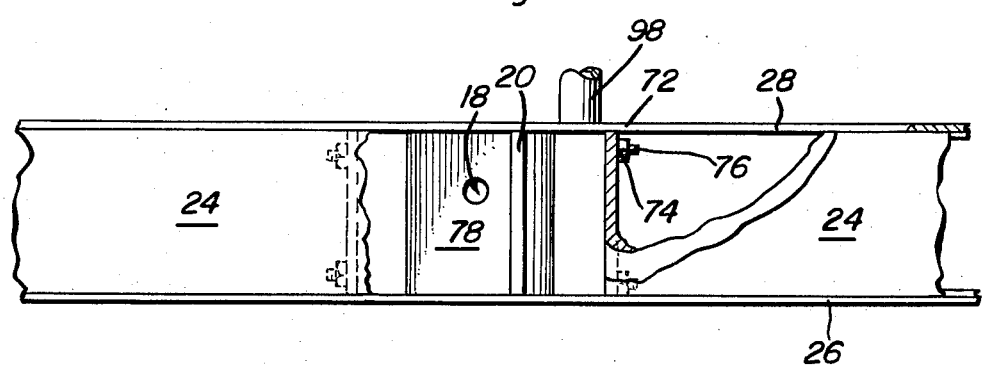
FIG. 7 shows the shutter and intake port configuration of the invention.

With reference to FIG. 1 together with FIG. 7, it will be seen that the power is supplied to the system from a standard boiler 64 which may be equipped to burn any known fossil or non-fossil fuel. The boiler 64 will be used to heat, preferably, freon F-113. This freon has a boiling point of 117.6 F. and is missible with refrigerant oils which can provide lubrication to the system. The heated freon under a pressure of 400 PSIG and temperature of 389 degrees F., enters inlet 18 through valve 66 which is operated by solenoid 68. Inlet valve 18 is located in inlet manifold 70 which is bolted to flanges 72 contained on the inner periphery of the inner circular wall 22 by the use of bolts 74 and studs 76. The manifold 70 also has shutter valve 20 mounted thereon and rotatable with respect thereto. The manifold 70 has a depression 78 into which shutter valve 20 is displayed upon contact therewith by the forward sloped wall 34 of piston 14.

Valving mechanism 16 which includes solenoid 68 and valve 66 is operated by the control circuit generally labelled 80. Circuit 80 includes two proximity switches 82 and 84. Proximity switch 82 controls the flow of current from battery 86 to solenoid control relay 88. When switch 82 senses the presence of the magnets mounted on piston 14, the switch closes thereby completing a circuit from the battery through relay 88 to ground. Normally open contacts 90 and 92 close. Closed contacts 90 supply energy to double acting solenoid 68 which places valve 66 in the open position supplying compressed vapor to the cylinder bore. Solenoid 88 is held in by current which passes to normally closed contacts 94 of latching relay 96. When the piston 14 passes proximity switch 84, the contacts of this switch close thus energizing relay 96 and opening contacts 94 thus deenergizing relay 88. In this manner, a variable power cycle may be effected through the positioning of switches 82 and 84.

Located approximately 355 degrees from intake port 18 is the exhaust port 98. Exhaust port 98 is in direct communication with condenser 100. As piston 14 travels under the influence of the expanding vapors from inlet 18, it pushes the spent vapors out of the chamber through exhaust port 98. The spent vapors are condensed in condenser 100 and the condensed freon is returned via pump 102 to boiler 64.

In operation therefore, it wil be seen that piston 14, when positioned in proximity to switch 82, is forced to move through the energy of the expanding vapors entering the chamber 12 through inlet 18. The piston 14 traverses the chamber past switch 84 whereupon valve 66 is closed thereby stopping the entry of vapors to the chamber. The expanding vapors continue to push piston 14 through the chamber until the piston reaches exhaust port 98. The momentum of the piston carries it past the exhaust port and displaces shutter valve 20. Once past shutter valve 20, piston 14 again causes the closure of switch 82 which forces a new supply of vapor into the chamber and closes the shutter valve 20. During the next cycle of the piston, the spent vapors from the previous cycle are expelled through the exhaust 98 and into condenser 100 where they are condensed and passed to the boiler through pump 102 to be reheated and presented to inlet 18 once again. Electrical energy may be extracted from the piston by the use of a toroidal coil (not shown) which may be wrapped about the exterior of chamber 12 in a known fashion.

Figure 6:
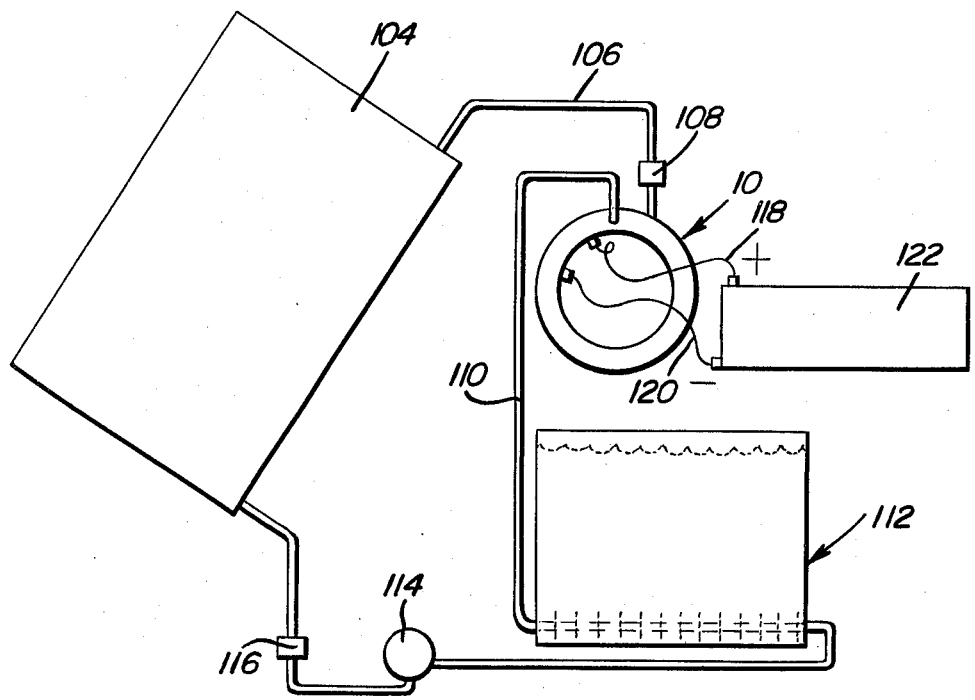
FIG. 6 is a schematic representation of a solar power version of the invention.

Now with reference to FIG. 6, a solar powered embodiment of the invention will be set forth. Shown in FIG. 6, a solar collector 104 takes the place of the previously used boiler. Solar collector 104 heats the working fluid which is passed through piping 106 and through injection valve 108 to the piston chamber of engine 10. The spent vapors are removed through tubing 110 and condensed in condenser 112. The condensed liquid is then stored in a reservoir 114 where it is drawn as needed by high pressure feed pump 116 and passed through solar collector 104 to repeat the cycle. The electrical energy is removed through wires 118 and 120 and stored for future use as in battery 122. Water may be used as the cooling fluid in condenser 112 and this cooling water upon leaving the condenser may be stored in a hot water heater for home use. The working fluid of this system is again preferably freon. The freon chosen may be a function of the temperature in which the system is to perform. For instance, freon 21, which boils at 48 degrees F. at a pressure of 200 PSIG, may be used during the colder seasons while freon 113 can be used during the hotter seasons. In this manner, the system may be adapted to the temperature and area in which it is to be used and will still effectively produce a significantly quantity of energy. Water may be the working fluid in high pressure and temp units such as municiple or proffessionally operated units.

Figure 5:
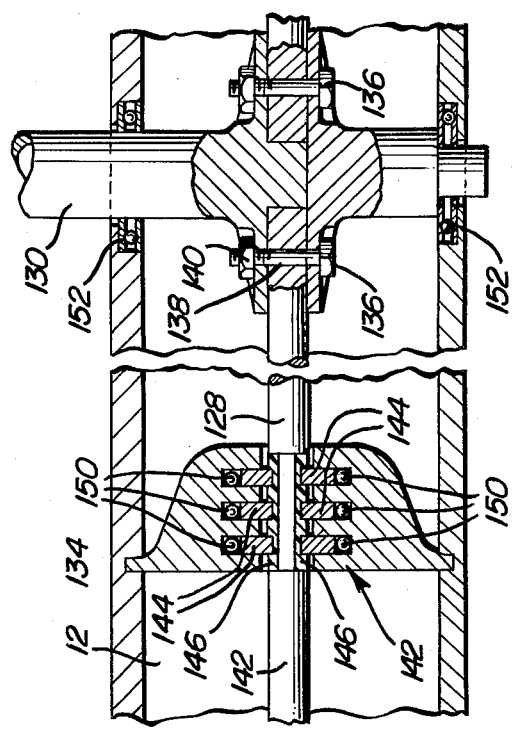
FIG. 5 is a sectional view showing the connection of the piston to the rotating shaft of the embodiment of FIG. 4.

With reference to FIGS. 4 and 5, a second embodiment of the engine shown generally at 124 will be set forth. This embodiment incorporates a nonfree piston 126. Piston 126 is attached to rotor plate 128 which rotates about and turns a central shaft 130. The mechanism of operation including the boiler valve system and shutter valve 20 are identical to those previously set forth and will not be discussed in detail. The sole difference between embodiment 124 and embodiment 10 is in the attachment of the piston to the shaft 130 as shown in embodiment 124. This rotating shaft 130 enables the use of a standardly available generator or alternator and limits the need for a toroidal coil wrapped about the chamber's exterior as is used and discussed in respect to the previous embodiment. As seen in FIG. 5, rotor extension 132 is bonded to piston 126 at the rear thereof. The rotor 128 extends through the inner circular wall 134 and connects to shaft 130 by use of bolts 136 which pass through annular slot 138 and the inner portion of rotor 128 and are held in place by nuts 140. The inner peripheral wall 134 includes seal seat structure 142. The seal seat structure includes three teflon seal rings 144 connected on each side of the rotor plate 128. These teflon steel rings are seated in teflon seal ring seats 146 which are bonded to the rotor. At the extreme end of each teflon seal ring, is included an annular O-ring 150 which seals between the teflon seals and the inner circular wall 134. Shaft 130 is supported and journalled by thrust bearings 152 and may be connected to any suitable fly wheel, alternators or any other suitable energy storing or converting devices. The bearings & walls will be sealed & leakage of freon through rotor seals scavenged to condenser.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An orbitally rotating free piston engine comprising:
   a stationary piston chamber configured in a hollow annulus;
   a piston disposed within said chamber and capable of orbitally traversing said chamber;
   valving means for closing off said chamber when not in contact with said piston and opening said chamber when contacted by said piston, said valving means including a shutter valve which extends across said hollow annulus, said shutter valve being pivotally connected to the chamber wall, and a recess disposed in the chamber wall proximate the shutter valve for receiving the shutter valve when said piston contacts said shutter valve forcing the shutter valve to pivot away from its position across said hollow annulus;
   energy transfer means for causing a reaction against said valving means for imparting motion to said piston; and
   power removal means for removing usable energy from said engine.

2. The engine of claim 1 wherein said energy transfer means includes a source of compressed propellant, and injection valve means for injecting said propellent into said chamber and allowing the expansion thereof, and control means for activating said injection valve based on the position of said piston.

3. The engine of claim 2 wherein said control means includes a first position responsive switch means responsive to the position of said piston to initiate activation of said injection valve and a second position responsive switch means responsive to the position of said piston to terminate activation of said injection valve.

4. The engine of claim 1 wherein said power removal means includes a plurality of magnets connected to said piston for movement therewith and an electrical conductor connected to the piston chamber, the piston and magnet traversing the chamber to produce electrical current in the conductor.

5. The engine of claim 2 wherein said power producing means further includes an exhaust means for removing said propellant from said chamber, a condenser for condensing said propellant, and a heating means for heating and pressurizing said propellant, said heating means being connected to said injection valve means.

6. The engine of claim 5 wherein said heating means comprises a boiler.

7. The engine of claim 5 wherein said heating means comprises a solar panel.

8. The engine of claim 1 wherein said power removal means includes a mechanical connection means mechanically connected to said piston through said chamber wall for producing rotation of an output shaft.

9. The engine of claim 1 wherein said piston chamber has a generally rectangular cross section and said piston has four walls which contact the four walls of said chamber and a forward sloping wall for periodic contact with said valving means.

10. A Rankine cycle energy converting device comprising:
    a rotating piston engine having a stationary annular piston chamber with a piston disposed within the chamber;
    a two-state refrigerant for use in the system;
    a heating means for heating and pressurizing said refrigerant;
    injection means for injecting said heated, pressurized refrigerant into the chamber whereby the vaporization and expansion of said refrigerant forces said piston through said chamber, exhaust means for removing the spent refrigerant from the said chamber;
    condenser means for condensing said refrigerant, said condenser means having an output connected to said injection means; and
    control means for controlling the injection of said propellant based on the position of said piston within said chamber, said control means including a first proximity sensor for sensing the position of said piston and a second proximity sensor spaced from said first proximity sensor for sensing a second position of said piston.

11. The system of claim 10 wherein said heating means includes a boiler.

12. The system of claim 10 wherein said heating means includes a solar panel.

13. The system of claim 10 wherein said piston includes at least one magnet located thereon for motion therewith through said chamber, and an electrical conductor disposed in proximity to said chamber, said moving magnet causing the production of electrical current within said conductor.

14. The system of claim 13 wherein said piston is constrained in motion only by the piston chamber.

* * * * *